(12) United States Patent
Oka

(10) Patent No.: US 10,754,327 B2
(45) Date of Patent: Aug. 25, 2020

(54) NUMERICAL CONTROLLER, NUMERICAL CONTROL METHOD AND NUMERICAL CONTROL PROGRAM

(71) Applicant: FANUC CORPORATION, Yamanashi (JP)

(72) Inventor: Masaki Oka, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 14 days.

(21) Appl. No.: 16/144,081

(22) Filed: Sep. 27, 2018

(65) Prior Publication Data

US 2019/0129388 A1 May 2, 2019

(30) Foreign Application Priority Data

Nov. 1, 2017 (JP) .................................. 2017-211955

(51) Int. Cl.
*G05B 19/416* (2006.01)
*G05B 19/4093* (2006.01)

(52) U.S. Cl.
CPC ... *G05B 19/4163* (2013.01); *G05B 19/40937* (2013.01); *G05B 19/40938* (2013.01); *G05B 2219/35398* (2013.01); *G05B 2219/36199* (2013.01); *G05B 2219/36283* (2013.01); *G05B 2219/36304* (2013.01); *G05B 2219/36308* (2013.01); *G05B 2219/45041* (2013.01)

(58) Field of Classification Search
CPC .......... G05B 19/4163; G05B 19/40938; G05B 2219/35398; G05B 2219/36283; G05B 2219/45041; B23K 26/38; B23K 26/0626; B23K 26/0876
See application file for complete search history.

(56) References Cited

U.S. PATENT DOCUMENTS

| 4,914,599 | A | * | 4/1990 | Seki | G05B 19/408 219/121.82 |
| 5,252,805 | A | * | 10/1993 | Nakata | B23K 26/0838 219/121.61 |
| 5,632,913 | A | * | 5/1997 | Mori | B23K 26/0853 219/121.6 |
| 5,847,359 | A | * | 12/1998 | Sugahara | B23K 26/08 219/121.72 |
| 2003/0192865 | A1 | * | 10/2003 | Cole, III | B23K 26/04 219/121.67 |

(Continued)

FOREIGN PATENT DOCUMENTS

JP 63-126685 5/1988

*Primary Examiner* — Christopher E. Everett
(74) *Attorney, Agent, or Firm* — Wenderoth, Lind & Ponack, L.L.P.

(57) ABSTRACT

To provide a numerical controller, a numerical control method and a numerical control program enabling to improve laser cutting speed. A numerical controller for dividing a laser cutting range into a plurality of sections and performing cutting in the respective sections with individual laser outputs includes a nonvolatile memory for storing division conditions and laser output conditions for the plurality of respective sections in association with a cutting condition identifier, and a CPU for specifying the cutting condition identifier as a command value along with an axial movement command in a cutting program, thereby sequentially applying the stored laser output conditions to the plurality of respective sections.

9 Claims, 4 Drawing Sheets

| NUMBER OF SECTIONS | DIVISION CONDITION | SECTION 1 | | | DIVISION CONDITION | SECTION 2 | | | DIVISION CONDITION | SECTION 3 | | | DIVISION CONDITION | SECTION 4 | | | DIVISION CONDITION | SECTION 5 | | |
|---|---|---|---|---|---|---|---|---|---|---|---|---|---|---|---|---|---|---|---|---|
| | | S | P | Q | | S | P | Q | | S | P | Q | | S | P | Q | | S | P | Q |
| 1 | 3 | 10% | 100 | 100 | 100 | 70% | ... | ... | ... | 20% | 200 | 100 | 100 | | | | | | | |
| 2 | 100 | 1ms | 100 | 100 | 100 | ... | ... | ... | ... | 10ms | 100 | 100 | 100 | ... | ... | ... | ... | ... | ... | ... |
| 3 | 5 | 20mm | 100 | 100 | 99 | 20mm | 0 | 100 | 99 | 20mm | 100 | 100 | 99 | 20mm | 0 | 100 | 99 | 20mm | 100 | 100 | 99 |
| ... | ... | ... | ... | ... | ... | ... | ... | ... | ... | ... | ... | ... | ... | ... | ... | ... | ... | ... | ... | ... |

PROGRAM COMMAND: G01 X100.

LASER ON / LASER OFF

SECTION 1 SECTION 2 SECTION 3 SECTION 4 SECTION 5
X: 0.0 → X: 100.0

(56) References Cited

U.S. PATENT DOCUMENTS

| | | | | |
|---|---|---|---|---|
| 2004/0129688 A1* | 7/2004 | Mori | ............ | B23K 26/06 |
| | | | | 219/121.61 |
| 2006/0178770 A1* | 8/2006 | Egawa | ............ | B23K 26/08 |
| | | | | 700/166 |
| 2007/0170157 A1* | 7/2007 | Miyajima | ............ | B23K 26/08 |
| | | | | 219/121.62 |
| 2011/0220623 A1* | 9/2011 | Beutler | ............ | B23K 26/0876 |
| | | | | 219/121.67 |
| 2013/0087536 A1* | 4/2013 | Suzuki | ............ | B23K 26/02 |
| | | | | 219/121.54 |
| 2015/0266161 A1* | 9/2015 | Noda | ............ | B24C 1/045 |
| | | | | 700/160 |

* cited by examiner

AXIAL MOVEMENT : G01 X100.

ACTUAL COMMANDS : G01 X20.　S100　P1000　Q99
　　　　　　　　　　G01 X40.　S0　　P1000　Q99
　　　　　　　　　　G01 X60.　S100　P1000　Q99
　　　　　　　　　　G01 X80.　S0　　P1000　Q99
　　　　　　　　　　G01 X100. S100　P1000　Q99

LASER ON
―――――

LASER OFF
- - - - -

NUMERICAL CONTROLLER, NUMERICAL CONTROL METHOD AND NUMERICAL CONTROL PROGRAM

This application is based on and claims the benefit of priority from Japanese Patent Application No. 2017-211955, filed on 1 Nov. 2017, the content of which is incorporated herein by reference.

BACKGROUND OF THE INVENTION

Field of the Invention

The present invention relates to a numerical controller, a numerical control method and a numerical control program for controlling a laser machine.

Related Art

A fiber laser oscillator instead of a conventional $CO_2$ laser oscillator is used in a laser machine in recent years. A fiber laser oscillator has excellent responsiveness to a command in laser output, and outputs a laser beam so as to follow axial movement even at high-speed movement, thereby enabling to improve cutting speed.

In an example, in the case of laser cutting of rectangular shapes (solid lines) which are arranged at constant intervals and are composed of a plurality of lattice-like partial line segments as shown in FIG. 4, such a laser machine linearly and continuously moves a cutting head from A to B and from C to D while alternately and repeatedly issuing a command to emit a laser beam and a command not to emit a laser beam, instead of cutting rectangular shapes one by one, thereby realizing high-speed cutting.

In such a case of switching laser outputs during the movement of the cutting head, a numerical controller issues a plurality of movement commands having different command values. For example, Patent Document 1 proposes a laser machine for dividing a cutting section into a plurality of sections, issuing a command to alternately arrange non-cutting sections and cutting sections, and generating an uncut remaining portion called a micro joint.

Patent Document 1: Japanese Unexamined Patent Application, Publication No. S63-126685

SUMMARY OF THE INVENTION

In a conventional method, as shown in FIG. 5, although axial movement in the original section (X: 0.0 to X: 100.0) divided into a plurality of sections is described in one command block, a cutting program needs to be described in a plurality of command blocks, in order that the laser output corresponding to a cutting condition is switched on and off. In an example, a plurality of command blocks are described in which blocks for commanding the laser output on with peak power of "S100" as a cutting condition and blocks for commanding the laser output off with peak power of "S0" as a cutting condition are described alternately.

In this case, as the number of times of switching the cutting condition increases, the length and time for the cutting head to move by one command block becomes shorter. The block processing time (BPT) then needs to be shortened, which is the time for reading one command block and generating executable format data. In an example, in the case where cutting is performed at a speed of 60000 mm/min, a cutting length of 1 mm by one command block requires BPT of 1 msec or less, while a cutting length of 0.1 mm by one command block requires BPT of 0.1 msec or less.

However, some numerical controllers may not achieve such required BPT depending on the processing speed thereof. In this case, as shown in FIG. 6, preparation for the next command is not completed in time after execution of the generated executable format data, that is, after the movement for one block of the cutting head, so that a waiting time occurs, resulting in decreasing cutting speed.

The object of the present invention is to provide a numerical controller, a numerical control method and a numerical control program enabling to improve cutting speed in laser cutting.

(1) A numerical controller (for example, a numerical controller 1 described below) according to the present invention divides a laser cutting range into a plurality of sections and performs cutting in the respective sections with individual laser outputs. The numerical controller includes a storage unit (for example, a nonvolatile memory 14 described below) for storing division conditions and laser output conditions for the plurality of respective sections in association with a cutting condition identifier, and a command unit (for example, a CPU 11 described below) for specifying the cutting condition identifier as a command value along with an axial movement command in a cutting program, thereby sequentially applying the laser output conditions stored in the storage unit to the plurality of respective sections.

(2) In the numerical controller according to (1), each of the laser output conditions may include at least any one of peak power, duty ratio and frequency.

(3) In the numerical controller according to (1) or (2), any one of ratio, time and distance to the laser cutting range may be specified as each of the division conditions.

(4) A numerical control method according to the present invention is executed by a computer (for example, a numerical controller 1 described below) for dividing a laser cutting range into a plurality of sections and performing cutting in the respective sections with individual laser outputs. The numerical control method includes the steps of storing division conditions and laser output conditions for the plurality of respective sections in a storage unit (for example, a nonvolatile memory 14 described below) in association with a cutting condition identifier, and specifying the cutting condition identifier as a command value along with an axial movement command in a cutting program, thereby sequentially applying the laser output conditions stored in the storage unit to the plurality of respective sections.

(5) A numerical control program according to the present invention is executed to divide a laser cutting range into a plurality of sections and perform cutting in the respective sections with individual laser outputs. The numerical control program makes a computer (for example, a numerical controller 1 described below) perform the steps of storing division conditions and laser output conditions for the plurality of respective sections in a storage unit (for example, a nonvolatile memory 14 described below) in association with a cutting condition identifier, and specifying the cutting condition identifier as a command value along with an axial movement command in a cutting program, thereby sequentially applying the laser output conditions stored in the storage unit to the plurality of respective sections.

The present invention enables to improve cutting speed in laser cutting.

DETAILED DESCRIPTION OF THE INVENTION

One exemplary embodiment of the present invention will be described below. A numerical controller 1 of the present embodiment controls operation of a machine tool having a laser cutting function. The numerical controller 1 performs laser cutting by sequentially transmitting control signals relating to axial movement and laser output to the machine tool.

Figure 1:
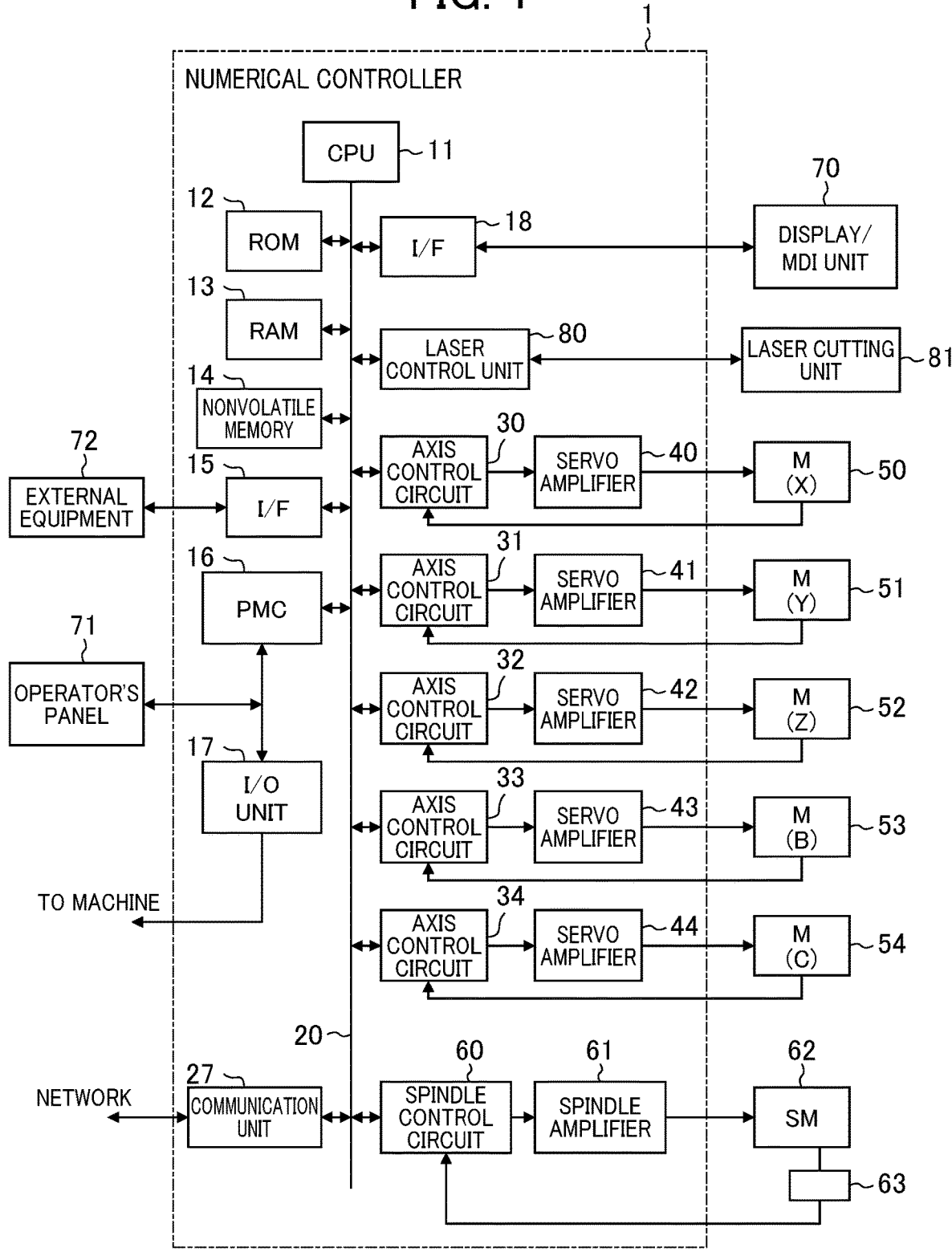
FIG. 1 is a block diagram illustrating a hardware configuration of a main part of a numerical controller.

FIG. 1 is a block diagram showing the hardware configuration of a principal part of the numerical controller 1. The numerical controller 1 includes a CPU 11 as a processor that controls the entire numerical controller 1. The CPU 11 reads a system program stored in a ROM 12 through a bus 20 and controls the entire numerical controller 1 by following the read system program. A RAM 13 stores temporary calculated data, display data, and various types of data input by an operator through a display/MDI unit 70. Generally, access is made faster to a RAM than to a ROM. Thus, the CPU 11 may deploy the system program stored in the ROM 12 in advance on the RAM 13. Then, the CPU 11 may read the system program from the RAM 13 and execute the read system program. A nonvolatile memory 14 is a magnetic storage unit, a flash memory, an MRAM, FRAM, or an EEPROM, for example. Alternatively, the nonvolatile memory 14 is an SRAM or a DRAM backed up by a battery, for example. The nonvolatile memory 14 is configured as a nonvolatile memory to hold its storage state even after the numerical controller 1 is powered off. The nonvolatile memory 14 stores a machining program, etc. input through an interface 15, the display/MDI unit 70, or a communication unit 27.

The ROM 12 stores various system programs written in advance for executing processing in an edit mode required for generation and editing of a machining program and for executing processing for automatic operation. Various machining programs are input through the interface 15, the display/MDI unit 70, or the communication unit 27, and are stored into the nonvolatile memory 14. The interface 15 connects between the numerical controller 1 and external equipment 72. A machining program, various parameters, etc., are read from the external equipment 72 into the numerical controller 1. The machining program edited in the numerical controller 1 can be stored into an external storage through the external equipment 72. Specific examples of the interface 15 include an RS232C interface, a USB, an SATA interface, a PC card slot, a CF card slot, an SD card slot, Ethernet, and Wi-Fi. The interface 15 can be located on the display/MDI unit 70. Examples of the external equipment 72 include a computer, a USB memory, a CFast card, a CF card, and an SD card.

A programmable machine controller (PMC) 16 outputs a signal through an I/O unit 17 to an auxiliary device (such as an automatic tool change device) of a machine tool to control the auxiliary device by following a sequence program provided in the numerical controller 1. The PMC 16 accepts signals input through various switches, etc. of an operator's panel 71 arranged at the body of the machine tool, executes necessary signal processing, and transfers the processed signals to the CPU 11. Generally, the PMC 16 is also called a programmable logic controller (PLC). The operator's panel 71 is connected to the PMC 16. The operator's panel 71 may include a manual pulse generator, for example. The display/MD unit 70 is a manual data input unit with a display 701 (display unit) and an operation unit such as a keyboard or a touch panel 702. An interface 18 is used for transmitting screen data to be displayed to the display 701 of the display/MDI unit 70. The interface 18 is also used for receiving a command and data from the operation unit of the display/MDI unit 70 and transferring the received command and data to the CPU 11.

Axis control circuits 30 to 34 of corresponding axes receive movement command amounts of the corresponding axes given from the CPU 11, and output the commands on the corresponding axes to servo amplifiers 40 to 44 respectively. In response to receipt of these commands, the servo amplifiers 40 to 44 drive servo motors 50 to 54 of the corresponding axes respectively. The servo motors 50 to 54 of the corresponding axes each include a built-in position and speed detector. The servo motors 50 to 54 transmit position and speed feedback signals as feedbacks to the axis control circuits 30 to 34 respectively, thereby exerting position and speed feedback control.

A spindle control circuit 60 outputs a spindle speed signal to a spindle amplifier 61 in response to receipt of a spindle rotation command directed to the machine tool. In response to receipt of the spindle speed signal, the spindle amplifier 61 rotates a spindle motor 62 of the machine tool at a rotation speed designated by the command, thereby driving a tool. A pulse encoder 63 is coupled to the spindle motor 62 with a gear or a belt, for example. The pulse encoder 63 outputs a feedback pulse in synchronization with the rotation of a spindle. The feedback pulse passes through the bus 20 to be read by the CPU 11.

A laser control unit 80 receives a laser output command for laser cutting based on the cutting program from the CPU 11. The laser output command includes commands with respect to, for example, peak power, frequency and duty ratio, for emitting predetermined-output laser light. The laser control unit 80 outputs a control signal based on the laser output command to a laser cutting unit 81.

The laser cutting unit 81 includes a laser oscillator for oscillating and emitting a laser beam, and a cutting head and a nozzle for irradiating a workpiece with the laser beam originally emitted by the laser oscillator and then converged by an optical system. The laser cutting unit 81 irradiates the workpiece with predetermined-output laser light on the basis of the control signal output by the laser control unit 80.

The description below is about a numerical control method related to the laser cutting to be executed by the numerical controller 1. The numerical controller 1 divides a laser cutting range into a plurality of sections on the basis of the input cutting program and cutting conditions, and performs cutting in the respective sections with individual laser outputs.

After reading out the cutting program stored in the nonvolatile memory 14 and deploying the program on the RAM 13, the CPU 11 serving as a command unit converts each block described in the cutting program into executable format data, and provides the laser control unit 80 with the data. At this time, the CPU 11, on the basis of the identifier indicating the cutting conditions set as a command value for each block, reads out the preset cutting conditions and generates the executable format data.

In an example, the cutting conditions are stored in the nonvolatile memory 14 (storage unit) as a database in which the division conditions and the laser output conditions for the plurality of respective sections are associated with a cutting condition identifier. It is noted that the cutting conditions to be switched may be deployed in advance on the RAM 13 (storage unit). Another method may be used in which an address where the cutting conditions have been deployed on the RAM 13 is specified as an identifier. This method is expected to further shorten the BPT.

Figure 2:
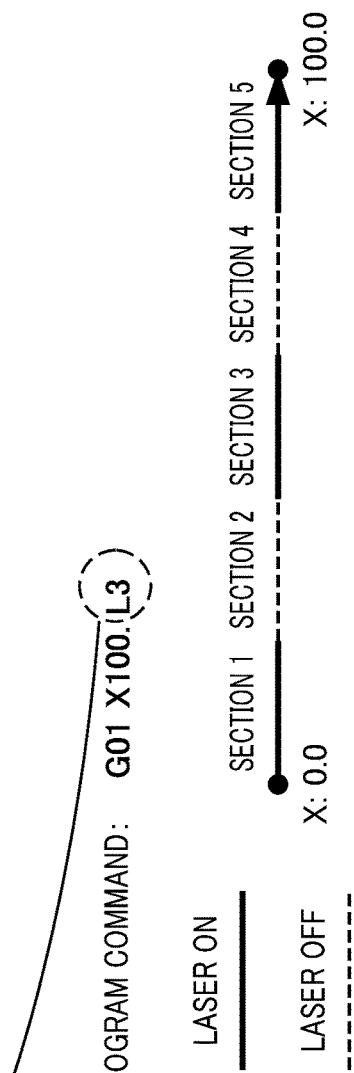
FIG. 2 is a diagram exemplifying cutting conditions and a referring method based on a cutting program.

FIG. 2 is a diagram exemplifying cutting conditions and a referring method based on the cutting program, according to the present embodiment. As each cutting condition, the number of sections into which the laser cutting range is divided, and the division conditions and the laser output conditions for respective sections are set with respect to an identifier corresponding to a reference number based on the cutting program.

In an example, any one of ratio, time and distance to the laser cutting range is specified as the division conditions. It is noted that the laser cutting range may not necessary be divided into plural equal sections. In an example, in a cutting condition number 1, the ratios of a section 1, a section 2 and a section 3 are set as 10%, 70% and 20% to the whole, respectively.

The laser output condition includes at least any one of peak power (S), duty ratio (P) and frequency (Q). The method of switching the laser output condition in the laser cutting range is not limited to on/off switching. In each section, each parameter of S, P and Q may be set independently, and may be set so that the power is gradually increased or decreased, as an example.

The cutting condition identifier is specified as a command value along with an axial movement command in the cutting program, whereby the CPU 11 sequentially applies the laser output conditions stored in the storage unit to the plurality of respective sections. At this time, the CPU 11 integrates moving distances, periods of time and the like at a predetermined control cycle, and determines the timing of switching the laser cutting conditions based on the set division conditions.

In an example, according to a block "G01 X100. L3" for commanding laser cutting from "X: 0.0" to "X: 100.0," a command value "L3" indicates that a cutting condition number 3 is referred to. Accordingly, the laser cutting according to the one command block is executed, in which the peak power is switched every 20 mm from a section 1 to a section 5.

Figure 3:
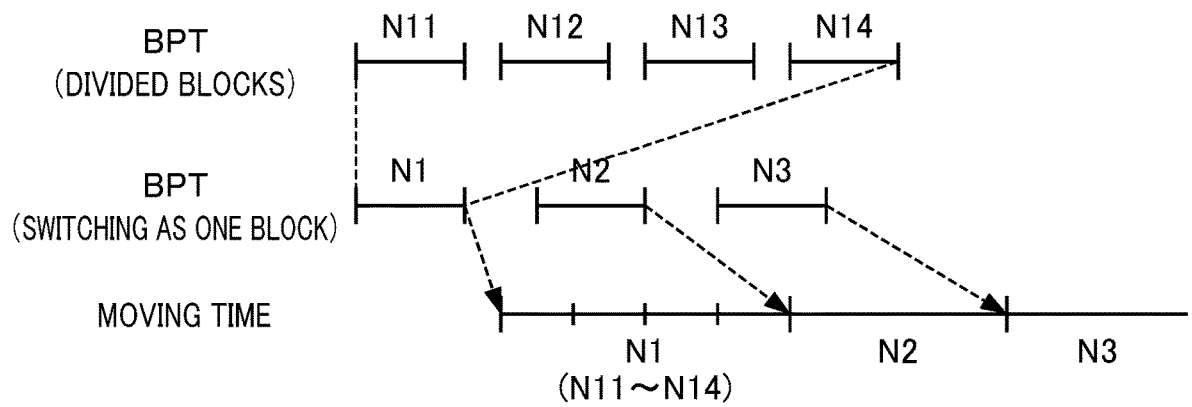
FIG. 3 is a diagram illustrating the relation between the time for generating executable format data and the time for executing the executable format data.
Figure 4:
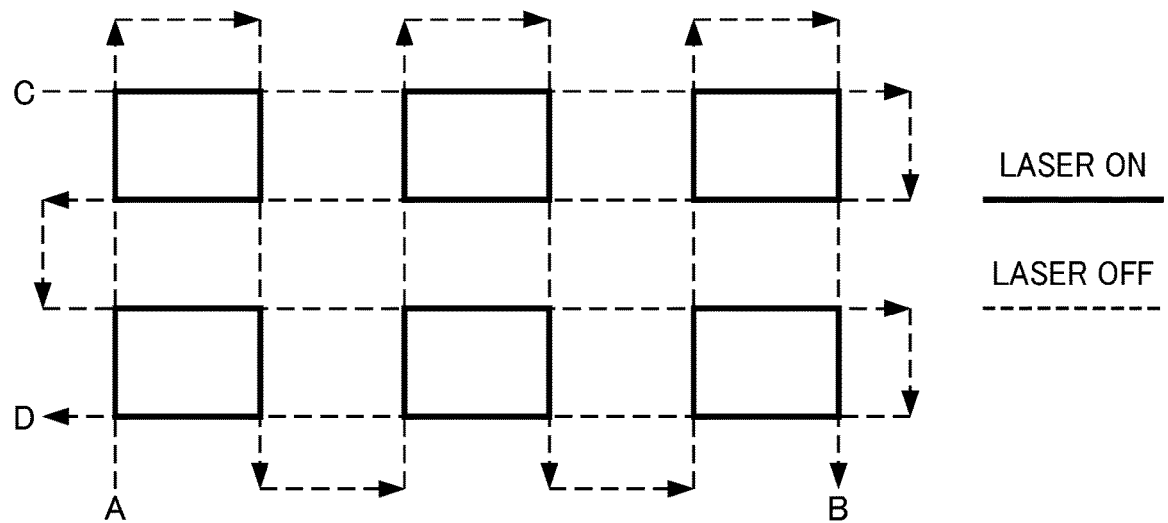
FIG. 4 is a diagram illustrating an exemplary locus of laser cutting.
Figure 5:
FIG. 5 is a diagram illustrating a conventional command method in the case of switching of cutting conditions.
Figure 6:
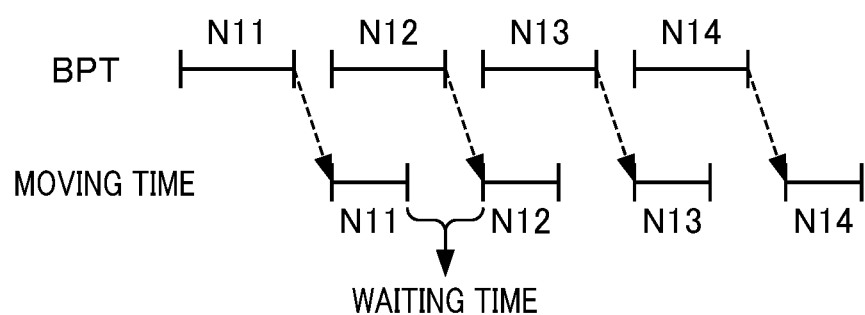
FIG. 6 is a diagram illustrating a waiting time in the conventional command method.

FIG. 3 is a diagram illustrating the relation between the time for generating the executable format data and the time for executing the executable format data, according to the present embodiment. This diagram exemplifies, in a comparison manner, the case where the laser cutting range composed of a plurality of sections is subjected to the one command block (for example, N1) of the cutting program according to the above-described method of specifying the cutting conditions in the present embodiment, and the case where the cutting conditions are switched for each of a plurality of divided blocks (for example, N11 to N14) according to a conventional method.

In the case where a plurality of cutting conditions are switched as one block according to the method of specifying the cutting conditions in the present embodiment, the BPT for this block is equivalent to that for the case where a single cutting condition is specified as one block. Therefore, the total period of time of the BPT for the case where the plurality of cutting conditions are switched as one block (for example, N1) is shorter than that for the case of the plurality of divided blocks (for example, N11 to N14). Accordingly, as the number of times of switching the cutting conditions in one block is larger and the cutting head moves longer, the period of time for executing the executable format data, that is, the period of time for moving the cutting head is expected to be longer than the BPT for each command block (N1 to N3). In this case, in an example, while the command for the block N1 is executed, the generation of the executable format data for the next block N2 is completed. On the other hand, in the case where the cutting conditions are switched for each of the blocks N11 to N14, the period of time for execution for each block is short. Accordingly, in an example, the generation of the executable format data for the block N12 is not completed while the command for the block N11 is executed, whereby a waiting time occurs. As described above, the commands described in a plurality of blocks (N11 to N14) are combined into one command block (N1), thereby eliminating any waiting time of the laser cutting unit 81, and resulting in improving the cutting speed as compared with the case where the cutting conditions are switched for each of the plurality of blocks.

According to the present embodiment, the numerical controller 1 stores in advance the division conditions and the laser output conditions for the plurality of respective sections in association with the cutting condition identifier, in the case of dividing the laser cutting range into a plurality of sections and performing cutting in the respective sections with individual laser outputs. The numerical controller 1 then specifies the cutting condition identifier as a command value along with the axial movement command in the cutting program, thereby sequentially applying the laser output conditions stored in the storage unit to the plurality of respective sections. Accordingly, the numerical controller 1 enables to perform laser cutting over the plurality of sections by one command block, unlike a conventional method by a plurality of command blocks. This allows to reduce the number of blocks in the cutting program, and to suppress shortening in time for execution and movement distance per block. As a result, the numerical controller 1 enables to reduce a waiting time occurring due to BPT and perform laser cutting at a higher speed, as compared with a conventional method of dividing a command in order to switch cutting conditions.

The numerical controller 1 enables to individually set at least any one of peak power, duty ratio and frequency for each of the divided sections as the laser output condition in just one command block in the cutting program.

The numerical controller 1 enables to divide the laser cutting range into a plurality of sections according to any one of ratio, time and distance by just the one command block in the cutting program, thereby enabling to apply independent laser output conditions to the respective sections.

Although the embodiment of the present invention has been described so far, the present invention is not limited to the above-described embodiment. The effects described in the present embodiment are listed merely as the most preferable effects produced by the present invention, and the effects produced by the present invention are not limited to those described in the present embodiment.

The numerical control method by the numerical controller 1 is realized by software. In the case where the method is realized by software, the programs included in the software are installed in a computer. The programs may be stored in a removable medium to be distributed to a user, or may be downloaded to user's computer via a network for distribution.

EXPLANATION OF REFERENCE NUMERALS

1 NUMERICAL CONTROLLER
11 CPU (COMMAND UNIT)
12 ROM
13 RAM (STORAGE UNIT)
14 NONVOLATILE MEMORY (STORAGE UNIT)
80 LASER CONTROL UNIT
81 LASER CUTTING UNIT

What is claimed is:

1. A numerical controller, the numerical controller comprising:
   a storage unit for storing a plurality of cutting condition identifiers, each cutting condition identifier of the plurality of cutting condition identifiers being associated with a plurality of sections of a laser cutting range and also being associated with division conditions and laser output conditions for the associated plurality of respective sections, the division conditions and laser output conditions also being stored in the storage unit; and
   a command unit for specifying a cutting condition identifier of the plurality of cutting condition identifiers as a command value along with an axial movement command in a cutting program, thereby sequentially applying the laser output conditions associated with the specified cutting condition identifier to the plurality of respective sections associated with the specified cutting condition identifier to perform cutting in the plurality of respective sections with individual laser outputs.

2. The numerical controller according to claim 1, wherein each of the laser output conditions includes at least any one of peak power, duty ratio and frequency.

3. The numerical controller according to claim 1, wherein any one of ratio, time and distance to the laser cutting range is specified as each of the division conditions.

4. The numerical controller according to claim 1, wherein any part of the division conditions and laser output conditions associated with one of the plurality of cutting condition identifiers differs from the division conditions and laser output conditions associated with another of the plurality of cutting condition identifiers.

5. The numerical controller according to claim 1, wherein a laser output condition switches between adjacent sections of the plurality of sections associated with a cutting condition identifier.

6. The numerical controller according to claim 1, wherein at least any one of the laser output conditions are individually set for each of the plurality of sections associated with a cutting condition identifier.

7. The numerical controller according to claim 1, wherein the sequentially applying of the laser output conditions associated with the specified cutting condition identifier simplifies the cutting program by making it possible to perform laser cutting over the plurality of respective sections associated with the specified cutting condition identifier by one command block of the cutting program.

8. A numerical control method to be executed by a computer, the numerical control method comprising the steps of:
   storing a pluraltiy of cutting condition identifiers, each cutting condition identifier of the plurality of cutting condition identifiers being associated with a plurality of sections of a laser cutting range and also being associated with division conditions and laser output conditions for the associated plurality of respective sections, the division conditions and laser output conditions also being stored in a storage unit; and
   specifying a cutting condition identifier of the plurality of cutting condition identifiers as a command value along with an axial movement command in a cutting program, thereby sequentially applying the laser output conditions associated with the specified cutting condition identifier to the plurality of respective sections associated with the specified cutting condition identifier to perform cutting in the plurality of respective sections with individual laser outputs.

9. A non-transitory computer readable medium storing a numerical control program, the numerical control program making a computer perform the steps of:
   storing a pluraltiy of cutting condition identifiers, each cutting condition identifier of the plurality of cutting condition identifiers being associated with a plurality of sections of a laser cutting range and also being associated with division conditions and laser output conditions for the associated plurality of respective sections, the division conditions and laser output conditions also being stored in a storage unit; and
   specifying a cutting condition identifier of the plurality of cutting condition identifiers as a command value along with an axial movement command in a cutting program, thereby sequentially applying the laser output conditions associated with the specified cutting condition identifier to the plurality of respective sections associated with the specified cutting condition identifier to perform cutting in the plurality of respective sections with individual laser outputs.

* * * * *